Oct. 24, 1939.   D. C. GEARIN   2,177,386
SIGNAL GUARD
Filed April 26, 1938
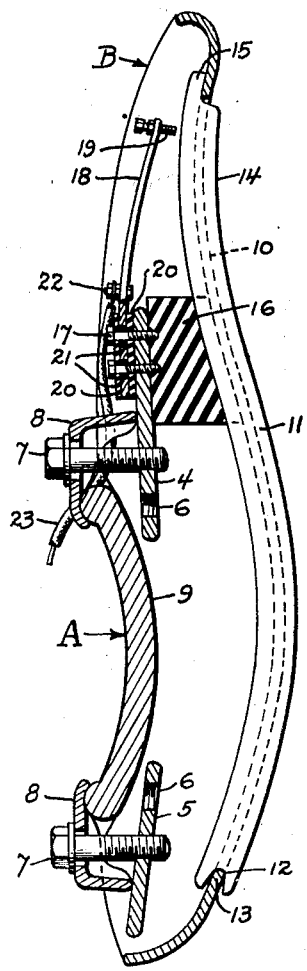
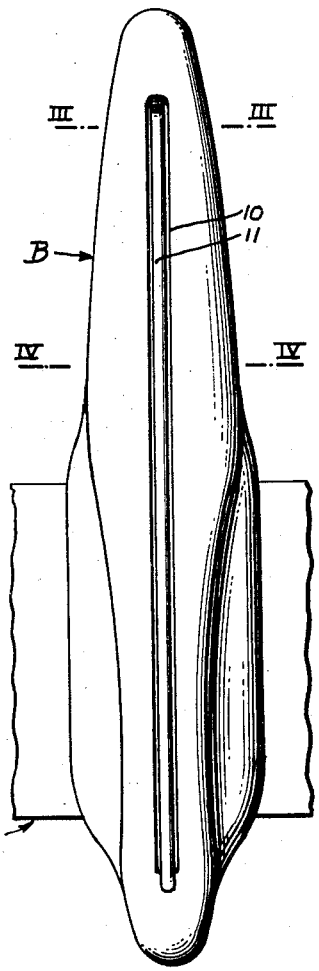
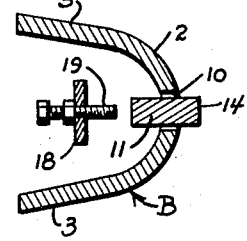
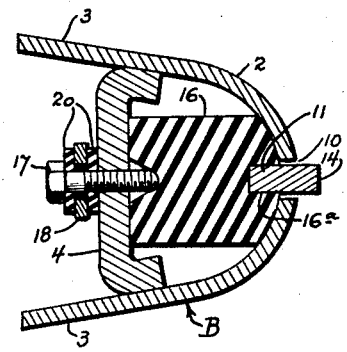
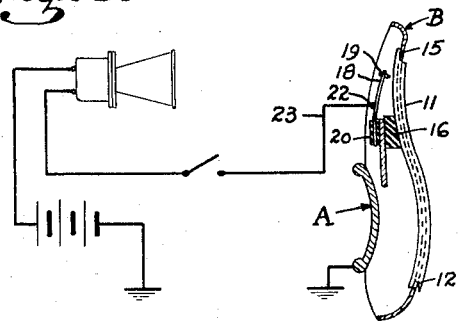
INVENTOR.
Dewey C. Gearin.
BY
Chas. E. Townsend.
ATTORNEY.

Patented Oct. 24, 1939

2,177,386

UNITED STATES PATENT OFFICE 2,177,386

SIGNAL GUARD

Dewey C. Gearin, San Francisco, Calif.

Application April 26, 1938, Serial No. 204,348

7 Claims. (Cl. 177—311)

This invention relates to a guard which is attachable to the front and rear bumpers of automobiles and like motor vehicles, said guard including a switch mechanism which is adapted to close an electric circuit to sound an audible alarm whenever pressure or impact is applied to the guard by the bumper of another automobile.

The parking of an automobile in a city or large community is a problem due to the many automobiles in use. If the driver is fortunate enough to find a parking space to back into, he has no assurance that his car will be safe, as he is likely to find that his fender has been dented or that his radiator grill has been damaged when he returns, as every community has irresponsible drivers who will not hesitate to bump other cars to get into or out of a parking space.

In order to lessen damage of this character, so-called bumper tips have lately come into vogue, but they are not altogether satisfactory, as both the car and the owner are entitled to more than just mute protection. Even though the bumper tips will reduce damage to the radiator grill and possibly the body and fenders, the engagement of one car with the bumper of another will in most instances tend to scratch or rub off the nickel or chromium finish with the result that rusting or peeling of the plating will soon take place.

The object of the present invention is to provide a signal guard which may be applied to the front or rear bumper of a car or both, and which will sound the horn or give a signal or alarm whenever the bumper is contacted by another car. Actual experience has shown that a car, when equipped with a guard of this character, is never bothered when parked due to the sounding of the alarm every time an attempt is made by another driver to push or jolt the car. Other objects of the invention are to provide a signal guard which is similar in appearance and structure to a bumper tip; to provide a guard of this character which will have all of the advantages of a bumper tip and the additional feature of sounding an alarm; to provide a signal guard which may be readily and quickly applied to almost any type of bumper now in use; and further, to provide a simple wiring system whereby the signal guard may be connected to the horn or other signal mechanism on the car.

The signal guard is shown by way of illustration in the accompanying drawing in which—

Fig. 1 is a front view of the signal guard;

Fig. 2 is a central vertical longitudinal section of the same;

Fig. 3 is a cross-section taken on line III—III of Fig. 1;

Fig. 4 is a cross-section taken on line IV—IV of Fig. 1; and

Fig. 5 is a diagrammatic view of the signal guard and an electric circuit therefor.

Referring to the drawing in detail, and particularly Figs. 1 and 2, A indicates the bumper of an automobile, and B a bumper attachment commonly known as a "bumper tip". As many as two or three bumper tips are attached to a bumper, and they are applied both to the front and rear bumpers to provide a maximum of protection. The main function of the bumper tip is to guard the radiator grill and fenders against damage from bumpers of older styles or types of cars, as the bumpers on the older cars are usually set considerably higher than the bumpers on later or more recent models. Hence, when the driver of an old car is backing to get sufficient space ahead to turn out to leave the parking space, his bumper may pass over the bumper of the car behind and as such is liable to do considerable damage to the grill guard and fenders of the car, but if the car is equipped with bumper tips, damage of that character cannot occur as the bumper tips are disposed at right angles to the main bumper and extend above the same a sufficient distance to prevent a high-set bumper from passing over it.

While the bumper tip has materially reduced damage to radiator grills and fenders, it has led to another abuse, that is, so many cars are now equipped with bumper tips that drivers take this protection for granted. For instance, if some drivers are parked where there is little room, they will try to give the car ahead a shove to gain room and then they will back up and do the same thing until enough room is gained to turn out. In doing this, the nickel or chromium plating is scraped or rubbed off the fenders and bumper tips, and in no time rust will appear and the brightly polished surface will be materially impaired.

I have discovered by actual experience that if a car is equipped with a guard which will sound a horn or give some other signal, audible or otherwise, when an attempt is made to bump or shove another car, the offender will immediately desist, as the noise produced not only annoys and astounds the offender, but also inspires fear that the attention of passers-by or even the owner may be attracted by the noise produced.

The present invention makes use of a bumper tip, and in addition thereto, a switch mechanism which closes a circuit to sound a horn or other suitable alarm the moment pressure is applied by the bumper of another car. The bumper tip here illustrated consists of an elongated shell B cast or pressed from steel or like metal. It is U-shaped in cross-section as shown in Figs. 3 and 4, and as such presents a rounded face 2 and sides 3—3 when viewed from the front. Welded or otherwise secured between the inner faces of the sides 3—3, and extending crosswise between them are plates 4 and 5 in which are formed one or more tapped or threaded openings 6 to receive fastening bolts 7 which extend through lugs 8 of any suitable form. The rear edges of the sides 3—3 of the bumper tip are cut or rounded out as shown at 9 to form a pair of seats conforming to the outer contour of the bumper A. Hence, when the bumper tip is to be applied or secured to a bumper, the bolts 7 and lugs 8 are first removed, and the tip is then placed against the outer face of the bumper, as shown in Fig. 2, with the seats 9 in engagement with the outer face thereof. The lugs 8 are then pushed to engage and grip the upper and lower inner edges of the bumper, and the bolts are then applied and tightened to securely grip and hold the bumper tip in place.

The structure so far described is standard construction. What I have done is to form a slot 10 in the rounded portion 2 of the bumper tip, said slot extending lengthwise of the bumper tip substantially from end to end thereof. In this slot is placed an arm 11. The lower end of the arm is forked as at 12 to straddle the lower portion of the bumper tip indicated at 13, and forms a pivotal support about which the arm may swing, as will hereinafter be described. The arm is nothing more nor less than a flat strip of metal having a thickness only slightly less than the width of the slot 10. This arm is bent to conform with the contour or shape of the bumper tip, and a portion of the arm, or that indicated at 14, projects outwardly beyond the face of the bumper tip throughout its length. The upper end of the arm is provided with a projection 15 which engages the inner face of the bumper tip and thereby limits outward movement of the arm. Inward movement about the pivot or portion 12 is limited and yieldingly resisted by a rubber block 16 secured between the inner face of the bumper tip and the crosspiece or plate 4.

Secured to the upper end of the crosspiece 4 by screws or similar means 17 is a contact arm 18 on which is mounted an adjustable contact screw 19. The arm 18 is insulated from the bumper tip by insulating strips 20 and bushings 21 which surround the screws 17. A terminal member 22 is also carried by the arm 18, and if a live wire such as shown at 23 is connected with the terminal 22 and the bumper tip itself is grounded, a circuit will be formed whenever the arm 11 is forced inwardly into engagement with the screw 19. This circuit may be connected with a horn or any other suitable form of signal that may be desired, and as a consequence, a signal or audible alarm will be given whenever such contact is made and the circuit closed.

The rubber block 16 is grooved as shown at 16a (see Fig. 4) to receive the arm 11 and to form a partial guide therefor. When the block 16 is inserted, it is under partial compression, as it should exert sufficient pressure on the arm 11 at all times to prevent rattling when the car is in operation. Further compression may be applied by permitting the screws 17 to project into the block. These screws also serve to secure the block against accidental removal.

While the rubber block is here shown, it is obvious that a spring or the like may be employed, and while other features of the invention have been more or less specifically described and illustrated, I wish it understood that changes may be resorted to within the scope of the appended claims.

The signal guard here shown has all the advantages and gives the same protection as the standard bumper tip now in use, but in addition thereto it gives the added protection of sounding an alarm or the like whenever pressure is applied to the arm 11. This arm projects beyond the face and the rounded portion 2 as shown at 14 in Figs. 3 and 4; hence, the moment the bumper of another car contacts the arm it will swing inwardly about the pivot and support 13, and will engage the contact 19 and thereby an electric circuit which actuates the alarm or whatever signal desired. The arms 11 and 18 are in reality nothing more nor less than a pair of switch arms movable to and away from each other and normally held in open position by the spring or rubber block 16. The mechanism is accordingly exceedingly simple, and at the same time is very effective for the purpose sought. It adds very little to the cost of an ordinary bumper tip and is just as quickly and readily applied as the ordinary bumper tip.

Having thus described my invention, what I claim and desire to secure by Letters Patent is:

1. A signal guard for motor vehicles and the like comprising an elongated metal shell, means for securing said shell to the bumper of a vehicle and at right angles thereto, said shell having a slot formed therein and extending lengthwise of the shell substantially from end to end thereof, an arm disposed in said slot with a portion thereof extending exteriorly of the shell, a pivotal support for one end of the arm to permit movement of the opposite end when pressure is applied to the arm, and means with which the arm is engageable to actuate an audible alarm.

2. A signal guard for motor vehicles and the like comprising an elongated metal shell, means for securing said shell to the bumper of a vehicle and at right angles thereto, said shell having a slot formed therein and extending lengthwise of the shell substantially from end to end thereof, an arm disposed in said slot with a portion thereof extending exteriorly of the shell, a yieldable support permitting movement of the arm when presssure is applied thereto, and means with which the arm is engageable to actuate an audible alarm.

3. A signal guard for motor vehicles and the like comprising an elongated metal shell, means for securing said shell to the bumper of a vehicle and at right angles thereto, said shell having a slot formed therein and extending lengthwise of the shell substantially from end to end thereof, an arm disposed in said slot with a portion thereof extending exteriorly of the shell, a pivotal support for one end of the arm to permit movement of the opposite end when pressure is applied to the arm, means with which the arm is engageable to actuate an audible alarm, and yieldable means normally holding the movable end of the arm out of engagement with said means.

4. A signal guard for motor vehicles and the like comprising an elongated metal shell, means for securing said shell to the bumper of a vehicle and at right angles thereto, said shell having a slot formed therein and extending lengthwise of the shell substantially from end to end thereof, an arm disposed in said slot with a portion thereof extending exteriorly of the shell, said arm being fork-shaped at one end and straddling a portion of the shell to form a pivotal support for the arm to permit inward swinging movement of the opposite end when pressure is applied to the arm, means to prevent outward swinging movement, yielding means resisting inward movement, and means with which the swinging end of the arm is engageable to actuate an audible alarm.

5. A signal guard for motor vehicles and the like comprising an elongated metal shell, means for securing said shell to the bumper of a vehicle and at right angles thereto, said shell having a slot formed therein and extending lengthwise of the shell substantially from end to end thereof, and an arm disposed in said slot with a portion thereof extending exteriorly of the shell, said arm being fork-shaped at one end and straddling a portion of the shell to form a pivotal support for the arm to permit inward swinging movement of the opposite end when pressure is applied to the arm, means to prevent outward swinging movement, a rubber block engaging the arm and resisting inward movement, and a contact with which the swinging end of the arm is engageable to close an electric circuit to actuate an audible alarm.

6. A signal guard for motor vehicles and the like comprising an elongated bumper element, means for securing said element to the horizontally disposed bumper guard of a vehicle and at right angles thereto, a yieldable member carried by the bumper element, and means with which the yieldable member is engageable to actuate an audible alarm.

7. A signal guard for motor vehicles and the like comprising an elongated bumper element, means for securing said element to the horizontally disposed bumper guard of a vehicle and at right angles thereto, an arm carried by the bumper element and extending beyond the exterior surface thereof, said arm being movable when pressure is applied thereto by the bumper of another vehicle, and means with which the arm is engageable to actuate an audible alarm.

DEWEY C. GEARIN.